US012691888B2

(12) United States Patent
McGrory et al.

(10) Patent No.: US 12,691,888 B2
(45) Date of Patent: Jul. 28, 2026

(54) MODEL PREDICTIVE LANE CENTERING CONTROL WITH REFERENCE SWITCHING AND DISTURBANCE REJECTION

(71) Applicant: GM Global Technology Operations LLC, Detroit, MI (US)

(72) Inventors: Jackson Barry McGrory, Mississauga (CA); Avshalom Suissa, Ganei Tikva (IL); Amirreza Mirbeygi Moghaddam, Toronto (CA); Jimmy Lu, Stouffville (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 18/931,472

(22) Filed: Oct. 30, 2024

(65) Prior Publication Data

US 2026/0116397 A1    Apr. 30, 2026

(51) Int. Cl.
*B60W 30/00* (2006.01)
*B60W 30/12* (2020.01)
(Continued)

(52) U.S. Cl.
CPC ........ *B60W 50/0097* (2013.01); *B60W 30/12* (2013.01); *B60W 30/18163* (2013.01);
(Continued)

(58) Field of Classification Search
CPC ............. B60W 50/0097; B60W 30/12; B60W 30/18163; B60W 40/114;
(Continued)

(56) References Cited

U.S. PATENT DOCUMENTS

2010/0076684 A1 * 3/2010 Schiffmann ........... G01S 13/867
                                                             701/301
2021/0139038 A1 * 5/2021 Wang ................... G05D 1/0088
(Continued)

FOREIGN PATENT DOCUMENTS

DE        102022111112 A1    2/2023
KR          20240064959 A  *  5/2024  .......... B60W 60/001

*Primary Examiner* — Erin M Piateski
*Assistant Examiner* — Michael T Dowling
(74) *Attorney, Agent, or Firm* — Vivacqua Crane, PLLC

(57) ABSTRACT

A model predictive lane centering (MPLC) control system with reference switching and disturbance rejection includes: an MPLC application having control logic that utilizes model predictive control (MPC) for selectively tracking static and dynamic references, adapts MPC weights and constraints for trajectory tracking when the system switches between static and dynamic references. A Kalman filter estimates a lateral force disturbance, a yaw moment disturbance acting upon a vehicle, and a measurement bias corrupting a measured yaw rate. The system detects anomalies in MPC reference trajectory and adjusts actuator constraints in response to detected anomalies. The system actively and continuously adjusts actuator outputs, causing the vehicle to track and follow a current lane center, and on receiving a lane change command, smoothly changes lanes using vehicle actuators to alter position and alter a vehicle trajectory to enter an adjacent lane before returning to tracking and following a center of the adjacent lane.

20 Claims, 5 Drawing Sheets

(51) Int. Cl.
    *B60W 30/18*         (2012.01)
    *B60W 40/114*       (2012.01)
    *B60W 50/00*        (2006.01)

(52) U.S. Cl.
    CPC ... *B60W 40/114* (2013.01); *B60W 2050/0022*
        (2013.01); *B60W 2050/0031* (2013.01); *B60W*
            *2050/0052* (2013.01); *B60W 2510/20*
        (2013.01); *B60W 2520/10* (2013.01); *B60W*
        *2520/14* (2013.01); *B60W 2530/10* (2013.01);
          *B60W 2530/20* (2013.01); *B60W 2540/215*
            (2020.02); *B60W 2552/10* (2020.02)

(58) Field of Classification Search
    CPC ....... B60W 2540/215; B60W 2552/10; B60W
           2050/0022; B60W 2050/0031; B60W
            2050/0052; B60W 2510/20; B60W
          2520/10; B60W 2520/14; B60W 2530/10;
                     B60W 2530/20
    USPC ........................................................ 701/27
    See application file for complete search history.

(56) References Cited

U.S. PATENT DOCUMENTS

| | | | |
|---|---|---|---|
| 2021/0291862 A1* | 9/2021 | Jiang ................ | B60W 60/0017 |
| 2022/0126824 A1 | 4/2022 | Kato | |
| 2023/0064300 A1* | 3/2023 | McGrory ............. | B60W 30/02 |
| 2023/0100742 A1* | 3/2023 | Sajadi Alamdari ... | B60W 50/00 |
| | | | 701/32.3 |

* cited by examiner

MODEL PREDICTIVE LANE CENTERING CONTROL WITH REFERENCE SWITCHING AND DISTURBANCE REJECTION

INTRODUCTION

The present disclosure relates to vehicles, and more specifically vehicles utilizing advanced driver assistance systems (ADAS) to fully or partially control vehicle motion.

Smart car technologies such as free-ranging on grid navigation, as well as parking guidance and information systems, aid in the prevention of human error when drivers operate a vehicle. Such technologies have been used to improve navigation of roadways, and to augment the parking abilities of vehicle drivers while the drivers are present within the vehicle. For example, rear view camera systems and impact alert systems have been developed to assist the operator of the vehicle while parking to avoid collisions. In addition, autonomous driving systems have been developed that autonomously or semi-autonomously allow vehicles to navigate roadways.

While such systems are useful for their intended purpose, these systems often result in discontinuous or jerky maneuvers between lanes after a driver or system-initiated lane change request has been received. Thus, there is a need in the art for improved smart car technologies that utilize preexisting infrastructure to autonomously and/or semi-autonomously allow for vehicles to navigate lane change requests smoothly, with high accuracy, robustness and redundancy, while maintaining or decreasing computational resource utilization and reducing effects of disturbances on driving smoothness of system-operated vehicles.

SUMMARY

According to several aspects, a system for model predictive lane centering (MPLC) control with reference switching and disturbance rejection includes: a vehicle, one or more sensors disposed on the vehicle, the one or more sensors measuring real-time static and dynamic data about the vehicle, and one or more actuators disposed on the vehicle. The one or more actuators alter static and dynamic characteristics of the vehicle. The system further includes a controller having a processor, a memory, and input/output (I/O) ports, the I/O ports in communication with the one or more sensors and the one or more actuators. The processor executes program code portions stored in the memory. The program code portions include an MPLC application having at least a first, a second, a third, a fourth, and a fifth control logic. The first control logic utilizes model predictive control (MPC) for selectively tracking static and dynamic references. The second control logic adapts MPC weights and constraints for trajectory tracking when the system switches between static and dynamic references. The third control logic utilizes a Kalman filter to estimate a lateral force disturbance and a yaw moment disturbance acting upon the vehicle, and a measurement bias corrupting a measured yaw rate. The fourth control logic detects anomalies in MPC reference trajectory. The fifth control logic adjusts actuator constraints in response to a detected anomaly. The system for MPLC control actively and continuously adjusts actuator output commands to selectively cause the vehicle to track and follow a current lane center, and upon receipt of a lane change command, smoothly executes a lane change by instructing the one or more actuators to alter position and smoothly alter a vehicle trajectory to enter an adjacent lane before returning to tracking and following a center of the adjacent lane.

In another aspect of the present disclosure the first control logic further includes control logic for obtaining data from the one or more sensors and the one or more actuators, and control logic for performing static reference tracking. The static reference tracking causes the vehicle to track and follow the current lane center. The first control logic further includes control logic for offsetting the vehicle from the current lane center while following and tracking the current lane center.

In another aspect of the present disclosure upon receiving the lane change command from one or more of a vehicle occupant and an advanced driver assistance system (ADAS), the MPLC application switches to tracking the dynamic reference. The dynamic reference is a smooth path that extends between a current static reference, and a future static reference.

In another aspect of the present disclosure the second control logic further includes control logic for adaptively adjusting MPC weights based on control objectives. When a reference changes, the weights change. The second control logic further includes control logic that, upon receipt of the lane change command, adaptively adjusts weights and constraints and subsequently ramps the weights and constraints back to nominal values over a predetermined period of time, thereby smoothing a transition between tracking static and dynamic references.

In another aspect of the present disclosure the second control logic further includes control logic that penalizes rapid changes in actuators positions, and control logic that, depending on whether a reference is a static reference or a dynamic reference, alters three distinct inputs to the MPC, namely: initial lateral error (ey), initial heading error (eψ), and reference curvature waypoints (ψr) according to:

$$\frac{d}{dt}\begin{bmatrix} e_y \\ V_y \\ e_\psi \\ \dot{\psi} \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz}V_{x_r}} & 0 & -\dfrac{C_f 1_f^2 - C_r 1_r^2}{I_{zz}V_{x_r}} \end{bmatrix} \begin{bmatrix} e_y \\ V_y \\ e_\psi \\ \dot{\psi} \end{bmatrix} +$$

$$\begin{bmatrix} 0 \\ \dfrac{c_f}{m} \\ 0 \\ \dfrac{C_f 1_f}{I_{zz}} \end{bmatrix} [\delta_f] + \begin{bmatrix} 0 \\ a_{y_d} \\ -\dot{\psi}_r \\ R_{z_d} \end{bmatrix}$$

where: Vx or Vxr defines a vehicle longitudinal velocity; Vy is vehicle lateral velocity; ωz or ψ is a yaw rate of the vehicle; ey is a lateral error (distance) from a target path; eψ is a heading error from target path; ψr is a yaw rate reference of target path (related to target path curvature); m is a mass of the vehicle; Izz is a rotational inertia of the vehicle; lf, lr are distances from a center of gravity of the vehicle to front and rear axles of the vehicle; Cf, Cr are front and rear tire cornering stiffnesses; δf is a front steering angle, and δr is a rear steering angle; Ayd and Rzd are lateral acceleration (force) and yaw acceleration (moment) disturbances, respectively; x, xd are state vector, and vector of disturbance/uncertainty states, respectively; and a hat ^ on top of any variable indicates that a hat-bearing variable is an estimate.

In another aspect of the present disclosure the third control logic further includes: control logic that compensates for estimated lateral force disturbance and estimated yaw moment disturbance by applying each of the estimated lateral force disturbance and estimated yaw moment disturbance along a prediction horizon in the MPC, and control logic that utilizes a bias-adjusted yaw rate in an initial state of the MPC, thereby compensating for an estimated measurement bias.

In another aspect of the present disclosure Kalman filter estimations of lateral force disturbance and estimated yaw moment disturbance use measured vehicle speeds and vehicle motion relative to a measured static reference. The measured static reference defines a static reference path.

In another aspect of the present disclosure the fourth control logic further includes control logic that detects anomalies in the MPC reference trajectory by comparing a trajectory offset, a heading, and a curvature with respect to moving averages of the trajectory offset, heading, and curvature. The fourth control logic further includes control logic that detects an anomaly when a difference between one or more of the trajectory offset, heading and curvature and moving averages of the trajectory offset, heading and curvature exceed a predetermined threshold.

In another aspect of the present disclosure the fourth control logic further includes control logic that inhibits anomaly detection using semantics from a trajectory planner in predefined situations including when a lane change has been requested.

In another aspect of the present disclosure the fifth control logic further includes control logic that adjusts actuator constraints by decreasing actuator magnitude and rate limits from a first level to a second level less than the first level for a predetermined period of time upon detecting an anomaly. The actuator magnitude limit is adjusted to limit vehicle lateral acceleration to within a band of predicted lateral acceleration based on a last anomaly-free reference trajectory curvature. The fifth control logic further includes control logic that steps the actuator rate limit down to a calibratable fraction of a nominal actuator rate limit during the predetermined period of time. Both magnitude and rate limits are temporarily held at reduced value before increasing linearly back to nominal values.

In another aspect of the present disclosure a method for model predictive lane centering (MPLC) control with reference switching and disturbance rejection includes: measuring real-time static and dynamic data about a vehicle with one or more sensors disposed on the vehicle. The method further includes altering static and dynamic characteristics of the vehicle with one or more actuators disposed on the vehicle, and executing, by a processor of a controller of the vehicle, program code portions stored in memory of the controller, the controller further including input/output (I/O) ports, communicating with the one or more sensors and the one or more actuators. The program code portions include an MPLC application having control logic for: utilizing model predictive control (MPC) for selectively tracking static and dynamic references; adapting MPC weights and constraints for trajectory tracking when switching between static and dynamic references, and for utilizing a Kalman filter to estimate a lateral force disturbance and a yaw moment disturbance acting upon the vehicle, and a measurement bias corrupting a measured yaw rate. The MPLC application further includes control logic for detecting anomalies in MPC reference trajectory, and for adjusting actuator constraints in response to a detected anomaly. The MPLC application actively and continuously adjusts actuator output commands to selectively cause the vehicle to track and follow a current lane center, and upon receipt of a lane change command, smoothly executes a lane change by instructing the one or more actuators to alter position and smoothly alter a vehicle trajectory to enter an adjacent lane before returning to tracking and following a center of the adjacent lane.

In another aspect of the present disclosure the method further includes obtaining data from the one or more sensors and the one or more actuators, performing static reference tracking, wherein the static reference tracking causes the vehicle to track and follow the current lane center; and offsetting the vehicle from the current lane center while following and tracking the current lane center.

In another aspect of the present disclosure upon receiving the lane change command from one or more of a vehicle occupant and an advanced driver assistance system (ADAS), the method executes control logic of the MPLC application that switches to tracking the dynamic reference. The dynamic reference is a smooth path that extends between a current static reference, and a future static reference.

In another aspect of the present disclosure the method further includes adaptively adjusting MPC weights based on control objectives. When a reference changes, the weights change, and upon receipt of the lane change command, adaptively adjusting weights and constraints and subsequently ramps the weights and constraints back to nominal values over a predetermined period of time, thereby smoothing a transition between tracking static and dynamic references.

In another aspect of the present disclosure the method further includes penalizing rapid changes in actuators positions, and depending on whether a reference is a static reference or a dynamic reference, altering three distinct inputs to the MPC, namely: initial lateral error ($e_y$), initial heading error ($e_\psi$), and reference curvature waypoints ($\dot{\psi}r$) according to:

$$\frac{d}{dt}\begin{bmatrix} e_y \\ V_y \\ e_\psi \\ \dot{\psi} \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz} V_{x_r}} & 0 & -\dfrac{C_f 1_f^2 - C_r 1_r^2}{I_{zz} V_{x_r}} \end{bmatrix} \begin{bmatrix} e_y \\ V_y \\ e_\psi \\ \dot{\psi} \end{bmatrix} +$$

$$\begin{bmatrix} 0 \\ \dfrac{c_f}{m} \\ 0 \\ \dfrac{C_f 1_f}{I_{zz}} \end{bmatrix} [\delta_f] + \begin{bmatrix} 0 \\ a_{y_d} \\ -\dot{\psi}_r \\ R_{z_d} \end{bmatrix}$$

where: Vx or Vxr defines a vehicle longitudinal velocity; Vy is vehicle lateral velocity; $\omega z$ or $\psi$ is a yaw rate of the vehicle; ey is a lateral error (distance) from a target path; e$\psi$ is a heading error from target path; $\psi$r is a yaw rate reference of target path (related to target path curvature); m is a mass of the vehicle; Izz is a rotational inertia of the vehicle; lf, lr are distances from a center of gravity of the vehicle to front and rear axles of the vehicle; Cf, Cr are front and rear tire cornering stiffnesses; δf is a front steering angle, and δr is a rear steering angle; Ayd and Rzd are lateral acceleration (force) and yaw acceleration (moment) disturbances, respectively; x, xd are state vector, and vector of disturbance/uncertainty states, respectively; and a hat ^ on top of any variable indicates that a hat-bearing variable is an estimate.

In another aspect of the present disclosure the method further includes compensating for estimated lateral force disturbance and estimated yaw moment disturbance by applying each of the estimated lateral force disturbance and estimated yaw moment disturbance along a prediction horizon in the MPC; and utilizing a bias-adjusted yaw rate in an initial state of the MPC, thereby compensating for an estimated measurement bias.

In another aspect of the present disclosure the method further includes using measured vehicle speeds and vehicle motion relative to a measured static reference. The measured static reference defines a static reference path to generate Kalman filter estimations of lateral force disturbance and estimated yaw moment disturbance.

In another aspect of the present disclosure the method further includes detecting anomalies in the MPC reference trajectory by comparing a trajectory offset, a heading, and a curvature with respect to moving averages of the trajectory offset, heading, and curvature. The method further includes detecting an anomaly when a difference between one or more of the trajectory offset, heading and curvature and moving averages of the trajectory offset, heading and curvature exceed a predetermined threshold; and inhibiting anomaly detection using semantics from a trajectory planner in predefined situations including when a lane change has been requested.

In another aspect of the present disclosure the method further includes adjusting actuator constraints by decreasing actuator magnitude and rate limits from a first level to a second level less than the first level for a predetermined period of time upon detection of an anomaly. The actuator magnitude limit is adjusted to limit vehicle lateral acceleration to within a band of predicted lateral acceleration based on a last anomaly-free reference trajectory curvature; and stepping the actuator rate limit down to a calibratable fraction of a nominal actuator rate limit during the predetermined period of time. Both magnitude and rate limits are temporarily held at reduced value before increasing linearly back to nominal values.

In another aspect of the present disclosure a method for model predictive lane centering (MPLC) control with reference switching and disturbance rejection includes: measuring real-time static and dynamic data about a vehicle with one or more sensors disposed on the vehicle; altering static and dynamic characteristics of the vehicle with one or more actuators disposed on the vehicle; and executing, by a processor of a controller of the vehicle, program code portions stored in memory of the controller. The controller further includes input/output (I/O) ports communicating with the one or more sensors and the one or more actuators. The program code portions include an MPLC application having control logic for: utilizing model predictive control (MPC) for selectively tracking static and dynamic references, including: obtaining data from the one or more sensors and the one or more actuators; and performing static reference tracking. The static reference tracking causes the vehicle to track and follow a current lane center. The MPLC application further includes control logic for offsetting the vehicle from the current lane center while following and tracking the current lane center. Upon receiving a lane change command from one or more of a vehicle occupant and an advanced driver assistance system (ADAS), executing control logic of the MPLC application that switches to tracking the dynamic reference. The dynamic reference is a smooth path that extends between a current static reference, and a future static reference. The MPLC application further includes control logic for adapting MPC weights and constraints for trajectory tracking when switching between static and dynamic references, including: adaptively adjusting MPC weights based on control objectives, and when a reference changes, the weights change. Upon receipt of the lane change command, adaptively adjusting weights and constraints and subsequently ramps the weights and constraints back to nominal values over a predetermined period of time, thereby smoothing a transition between tracking static and dynamic references. The MPLC application further includes control logic for penalizing rapid changes in actuators positions; depending on whether a reference is a static reference or a dynamic reference, alters three distinct inputs to the MPC, namely: initial lateral error (ey), initial heading error (eψ), and reference curvature waypoints (ψr) according to:

$$\frac{d}{dt}\begin{bmatrix} e_y \\ V_y \\ e_\psi \\ \dot{\psi} \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz}V_{x_r}} & 0 & -\dfrac{C_f 1_f^2 - C_r 1_r^2}{I_{zz}V_{x_r}} \end{bmatrix} \begin{bmatrix} e_y \\ V_y \\ e_\psi \\ \dot{\psi} \end{bmatrix} +$$

$$\begin{bmatrix} 0 \\ \dfrac{c_f}{m} \\ 0 \\ \dfrac{C_f 1_f}{I_{zz}} \end{bmatrix} [\delta_f] + \begin{bmatrix} 0 \\ a_{y_d} \\ -\dot{\psi}_r \\ R_{z_d} \end{bmatrix}$$

where: Vx or Vxr defines a vehicle longitudinal velocity; Vy is vehicle lateral velocity; ωz or ψ is a yaw rate of the vehicle; ey is a lateral error (distance) from a target path; eψ is a heading error from target path; ψr is a yaw rate reference of target path (related to target path curvature); m is a mass of the vehicle; Izz is a rotational inertia of the vehicle; lf, lr are distances from a center of gravity of the vehicle to front and rear axles of the vehicle; Cf, Cr are front and rear tire cornering stiffnesses; δf is a front steering angle, and δr is a rear steering angle; Ayd and Rzd are lateral acceleration (force) and yaw acceleration (moment) disturbances, respectively; x, xd are state vector, and vector of disturbance/uncertainty states, respectively; and a hat ^ on top of any variable indicates that a hat-bearing variable is an estimate. The MPLC application further includes control logic for utilizing a Kalman filter to estimate a lateral force disturbance and a yaw moment disturbance acting upon the vehicle, and a measurement bias corrupting a measured yaw rate, including: compensating for estimated lateral force disturbance and estimated yaw moment disturbance by applying each of the estimated lateral force disturbance and estimated yaw moment disturbance along a prediction horizon in the MPC; and for utilizing a bias-adjusted yaw rate in an initial state of the MPC, thereby compensating for an estimated measurement bias. The MPLC application further includes control logic for using measured vehicle speeds and vehicle motion relative to a measured static reference. The measured static reference defines a static reference path to generate Kalman filter estimations of lateral force disturbance and estimated yaw moment disturbance, detecting anomalies in MPC reference trajectory, including: detecting anomalies in the MPC reference trajectory by comparing a trajectory offset, a heading, and a curvature with respect to moving averages of the trajectory offset, heading, and curvature, and for detecting an anomaly when a difference between one or more of the trajectory offset, heading and curvature and moving averages of the trajectory offset, heading and curvature exceed a predetermined threshold. The MPLC application further includes control logic for inhibiting anomaly detection using semantics from a trajectory planner in predefined situations including when a lane change has been requested; and adjusting actuator constraints in response to a detected anomaly, including: adjusting actuator constraints by decreasing actuator magnitude and rate limits from a first level to a second level less than the first level for a predetermined period of time upon detection of an anomaly. The actuator magnitude limit is adjusted to limit vehicle lateral acceleration to within a band of predicted lateral acceleration based on a last anomaly-free reference trajectory curvature; and stepping the actuator rate limit down to a calibratable fraction of a nominal actuator rate limit during the predetermined period of time. Both magnitude and rate limits are temporarily held at reduced value before increasing linearly back to nominal values. The MPLC application actively and continuously adjusts actuator output commands to selectively cause the vehicle to track and follow a current lane center, and upon receipt of a lane change command, smoothly executes a lane change by instructing the one or more actuators to alter position and smoothly alter a vehicle trajectory to enter an adjacent lane before returning to tracking and following a center of the adjacent lane.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
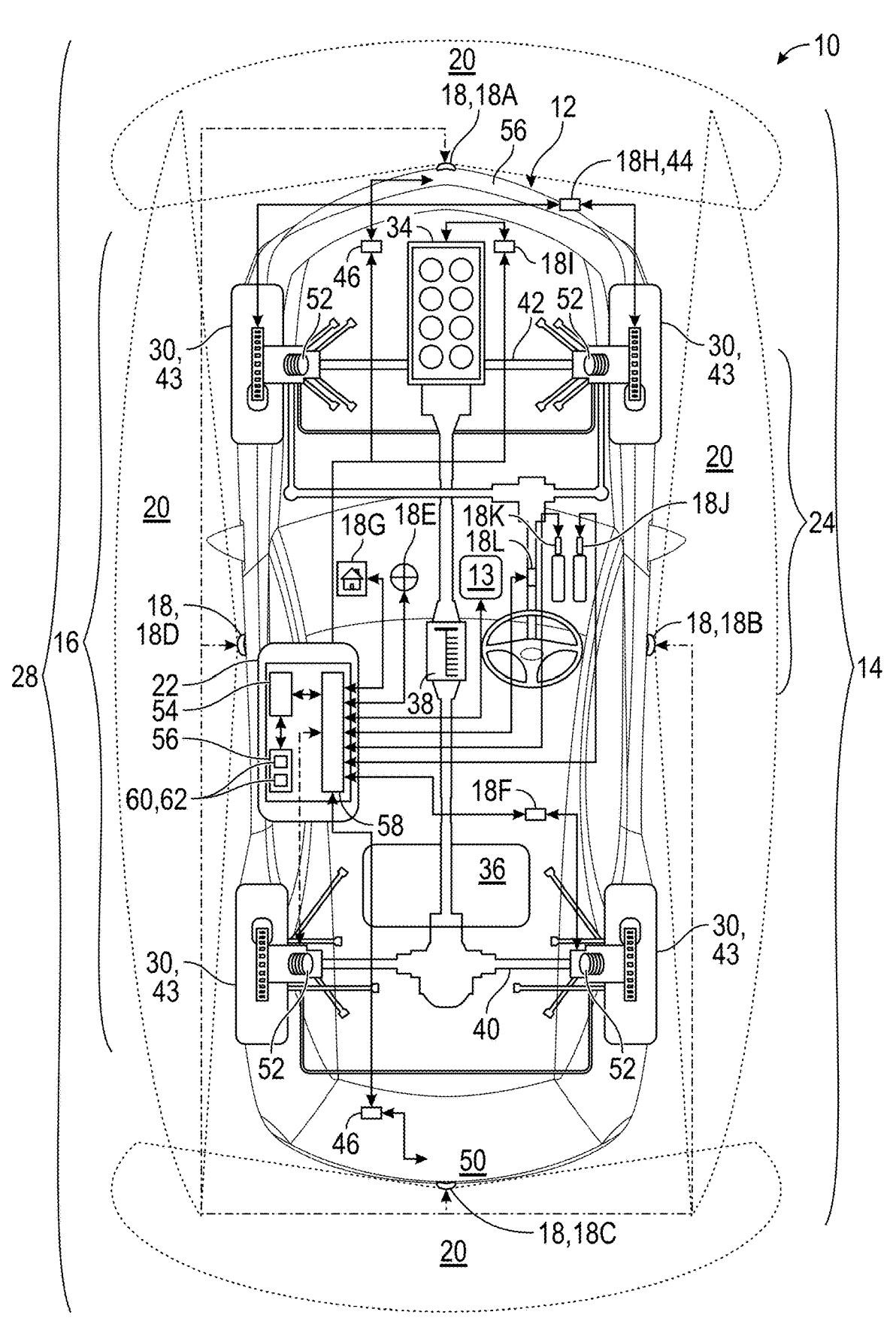
FIG. 1 is a schematic diagram of a model predictive lane centering (MPLC) control system with reference switching and disturbance rejection according to an exemplary embodiment.

Referring to FIG. 1, a model predictive lane centering control (MPLC) system 10 is shown in schematic form. The system 10 includes a vehicle 12. The vehicle 12 is illustrated as a passenger vehicle, however, it should be appreciated that the vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12 which makes contact with the ground without departing from the scope or intent of the present disclosure. The vehicle 12 is equipped with at least one human-machine interface (HMI) 13 that allows vehicle 12 occupants to interact with various systems of the vehicle 12. In some examples, the HMI 13 may include a steering wheel and/or buttons and/or dials and/or haptic interfaces disposed thereon, an accelerator pedal, a brake pedal, a transmission shifting device, a clutch pedal, and one or more buttons or screens of an infotainment system and/or heating, ventilation and air conditioning (HVAC) system of the vehicle. In a non-limiting example, the HMI 13 may include a touch-screen interface mounted within a passenger compartment of the vehicle 12. The touchscreen interface provides vehicle 12 occupants with prompts and/or information with which the occupants may interact to alter vehicle 12 functionality, including altering HVAC temperature control functions and advanced driver assistance system (ADAS) functionality, including lane-keeping and lane changing preferences. In some additional non-limiting examples, the HMI 13 may include one or more turn signal indicator stalks or buttons, windscreen wiper control stalks or buttons, or the like.

The MPLC system 10 may have various configurations without departing from the scope of the present disclosure, but generally includes a sensor sub-system 14, and a vehicle motion control (VMC) system 16. The sensor sub-system 14 includes a plurality of electromagnetic sensors 18A-18D mounted along a periphery of the vehicle 12. In the example provided in FIG. 1, the EM sensors 18A-18D are located at the front, left, right, and rear of the vehicle 12, respectively, to provide 360 degrees of overlapping EM sensor 18A-18D coverage. However, it should be appreciated that the sensor sub-system 14 may have any quantity of sensors 18, and that the EM sensors 18A-18D may cover, recover, or have overlapping fields of view 20 without departing from the scope or intent of the present disclosure. Each of the EM sensors 18A-18D is operable to collect or sense information in a predefined area surrounding the vehicle 12. Information from the EM sensors 18A-18D is communicated to a controller 22. The controller 22 communicates both the sensor sub-system 14 and the VMC system 16. In an example, the EM sensors 18A-18D include EM sensors such as cameras, infra-red cameras, video cameras, light detection and ranging (LiDAR) sensors, radio detection and ranging (RADAR) sensors, sound navigation and ranging (SONAR) sensors. Additional sensors 18 detect static and dynamic state information about the vehicle 12. In several examples, the additional sensors 18 may measure and record a wide variety of static and dynamic vehicle 12 state information or date. The additional sensors 18 may include, without limitation: inertial measurement units (IMUs) 18E, suspension control units such as Semi Active Damping Suspension (SADS) 18F, global positioning system (GPS) 18G sensors 18G, wheel speed sensors 18H capable of measuring rotational speeds of one or more wheels 22 of the vehicle 12, throttle position sensors 18I, accelerator pedal position sensors 18J, brake pedal position sensors 18K, steering position sensors 18L capable of measuring a steering system 24 position, steering rate, and steering velocity, tire pressure monitoring systems 18M, aerodynamic element position sensors 18N, and the like. The IMUs 18E can measure movement, acceleration, and the like in several degrees of freedom. In a specific example, the IMUs 18E may measure position, movement, acceleration, etc. in at least three degrees of freedom. Likewise, the SADS 18F sensors may be IMUs 18E capable of measuring in three or more degrees of freedom. In some examples, the SADS 18F may be suspension hub accelerometers, or the like. Accordingly, vehicle 12 state information may include any of a wide variety of data including but not limited to: wheel 22 speed data, SADS 18F, GPS 18G, and IMU 18E data including attitude, acceleration, location, and the like.

In addition, the MPLC system 10 is operable to autonomously or semi-autonomously move, maneuver, or otherwise drive the vehicle 12 via a plurality of actuators 26 capable of altering vehicle 12 motion while the vehicle 12 is operating in manual, semi-autonomous, or fully autonomous modes using advanced driver assistance systems ADAS (28). The vehicle 12 includes one or more wheels 30 connected to a drivetrain 32. The drivetrain 32 may include a variety of components, such as an internal combustion engine (ICE) 34 and/or electric motors 36, transmissions 38 capable of transmitting motive power developed by the ICEs 34 and/or electric motors 36 to the wheels 30. In one non-limiting example, the vehicle 12 may include an ICE 34 acting on a rear axle 40 and one or more electric motors 36 acting on a front axle 42 of the vehicle 12. It should be appreciated, however, that the vehicle 12 may use one or more ICEs 34 and/or one or more electric motors 36 in other configurations without departing from the scope or intent of the present disclosure. For example, the vehicle 12 may have an ICE 34 acting only on the front axle 42 while electric motor(s) 36 act only on the rear axle 40. In further examples, the ICE 34 may act on both front and rear axles 42, 40, and an electric motor 36 may act on both the front and rear axles 42, 40 as well. In several aspects, the drivetrain 32 includes one or more actuators such as all-wheel drive (AWD) systems including electronically-controlled or electric AWD (eAWD) systems, as well as limited slip differentials (LSDs) including electronically-controlled limited slip differential (eLSD) systems, where each of the AWD, eAWD, LSD, and eLSD systems is capable of generating and/or modifying force generation in X and/or Y directions at a road surface contact patch with tires 43 disposed on the wheels 30. An AWD and/or eAWD system may transfer torque generated by an ICE 34 and/or electric motor 36 to and from front and rear axles 42, 40 of the vehicle 12 and/or from side-to-side of the vehicle 12. Likewise, an LSD or eLSD system may transfer torque from side-to-side of the vehicle 12. In some examples, the AWD/LSD and/or eAWD/eLSD may directly alter or manage torque delivery from the ICE 34 and/or electric motors 36 and/or the AWD/LSD and/or eAWD/ eLSD may act on a braking system 44 of the vehicle 12 to adjust a quantity of torque delivered to each of the wheels 30 of the vehicle 12.

In further examples, the vehicle 12 may include a means of altering a normal force on each of the wheels 30 of the vehicle 12 via one or more active aerodynamic actuators 46 and/or active suspension actuators 48. The active aerodynamic actuators 46 may actively or passively alter an aerodynamic profile of one or more active aerodynamic elements 50 of the vehicle 12, such as wings, spoilers, fans, or other suction devices, actively-managed Venturi tunnels, and the like. Active suspension actuators 48, such as active dampers 52, may be magnetorheological dampers or other such electrically, hydraulically, mechanically, or pneumatically-adjustable dampers, without departing from the scope or intent of the present disclosure. For the sake of simplicity in the description that follows, ICEs 34, electric motors 36, eAWD, eLSD, LSD, AWD, braking system 44, aerodynamic control system, active aerodynamic elements 50, active dampers 52 and the like will be referred to simply and more broadly as "actuators 26".

The terms "forward", "rear", "inner", "inwardly", "outer", "outwardly", "above", and "below" are terms used relative to the orientation of the vehicle 12 as shown in the drawings of the present application. Thus, "forward" refers to a direction toward a front of a vehicle 12, "rearward" refers to a direction toward a rear of a vehicle 12. "Left" refers to a direction towards a left-hand side of the vehicle 12 relative to the front of the vehicle 12. Similarly, "right" refers to a direction towards a right-hand side of the vehicle 12 relative to the front of the vehicle 12. "Inner" and "inwardly" refers to a direction towards the interior of a vehicle 12, and "outer" and "outwardly" refers to a direction towards the exterior of a vehicle 12, "below" refers to a direction towards the bottom of the vehicle 12, and "above" refers to a direction towards a top of the vehicle 12. Further, the terms "top", "overtop", "bottom", "side" and "above" are terms used relative to the orientation of the actuators 26, and the vehicle 12 more broadly shown in the drawings of the present application. Thus, while the orientation of actuators 52, or vehicle 12 may change with respect to a given use, these terms are intended to still apply relative to the orientation of the components of the system 10 and vehicle 12 components shown in the drawings.

Each of the plurality of actuators 26 and the plurality of sensors 18 equipped to the vehicle 12 communicate with the controllers 22. The controller 22 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The vehicle 12 may have controllers

11 | 12

14 including a dedicated Wi-Fi controller or an engine control module, a transmission control module, a body control module, an infotainment control module, etc. The I/O ports 58 may be configured to communicate via wired communications, wirelessly via Wi-Fi protocols under IEEE 802.11x, or the like without departing from the scope or intent of the present disclosure.

The controller 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, aerodynamic control system functions, or the like in an exemplary vehicle 12.

Figure 2B:
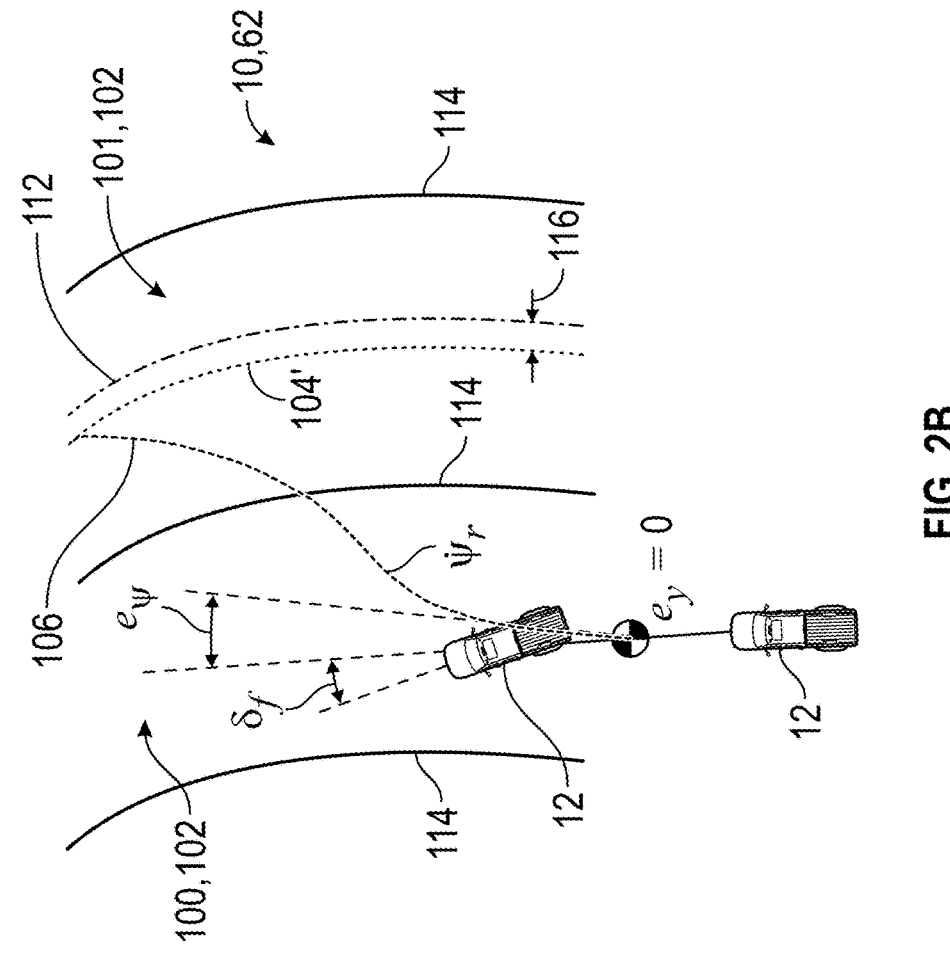
FIG. 2B is a partial schematic diagram of a vehicle equipped with the MPLC control system of FIG. 1 performing a lane change according to an exemplary embodiment.
Figure 2A:
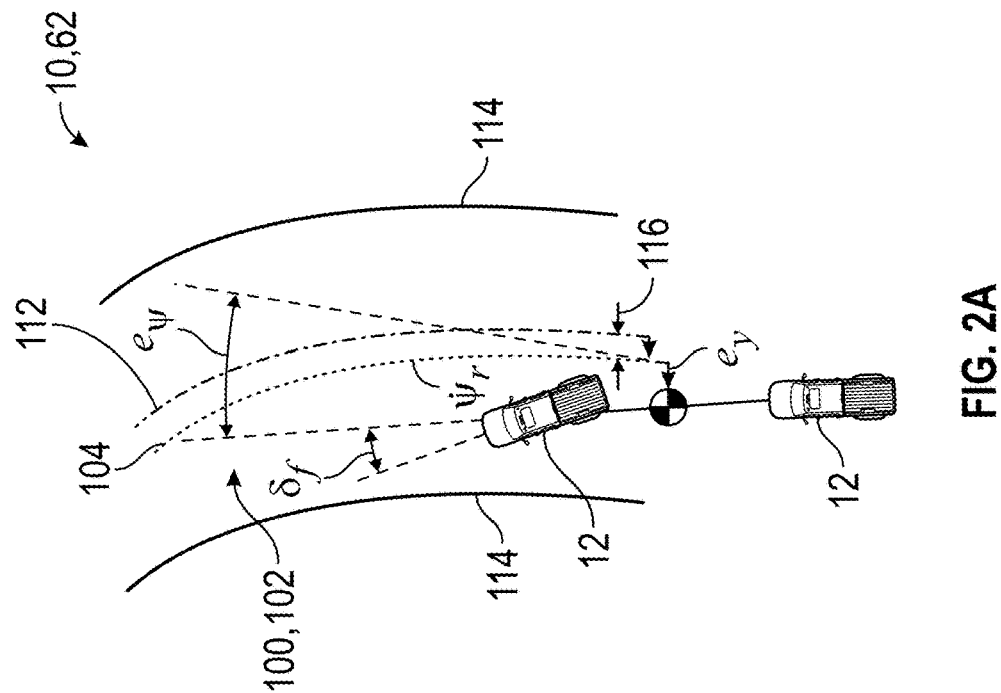
FIG. 2A is a partial schematic diagram of a vehicle equipped with the MPLC control system of FIG. 1 performing static reference tracking according to an exemplary embodiment.
Figure 3:
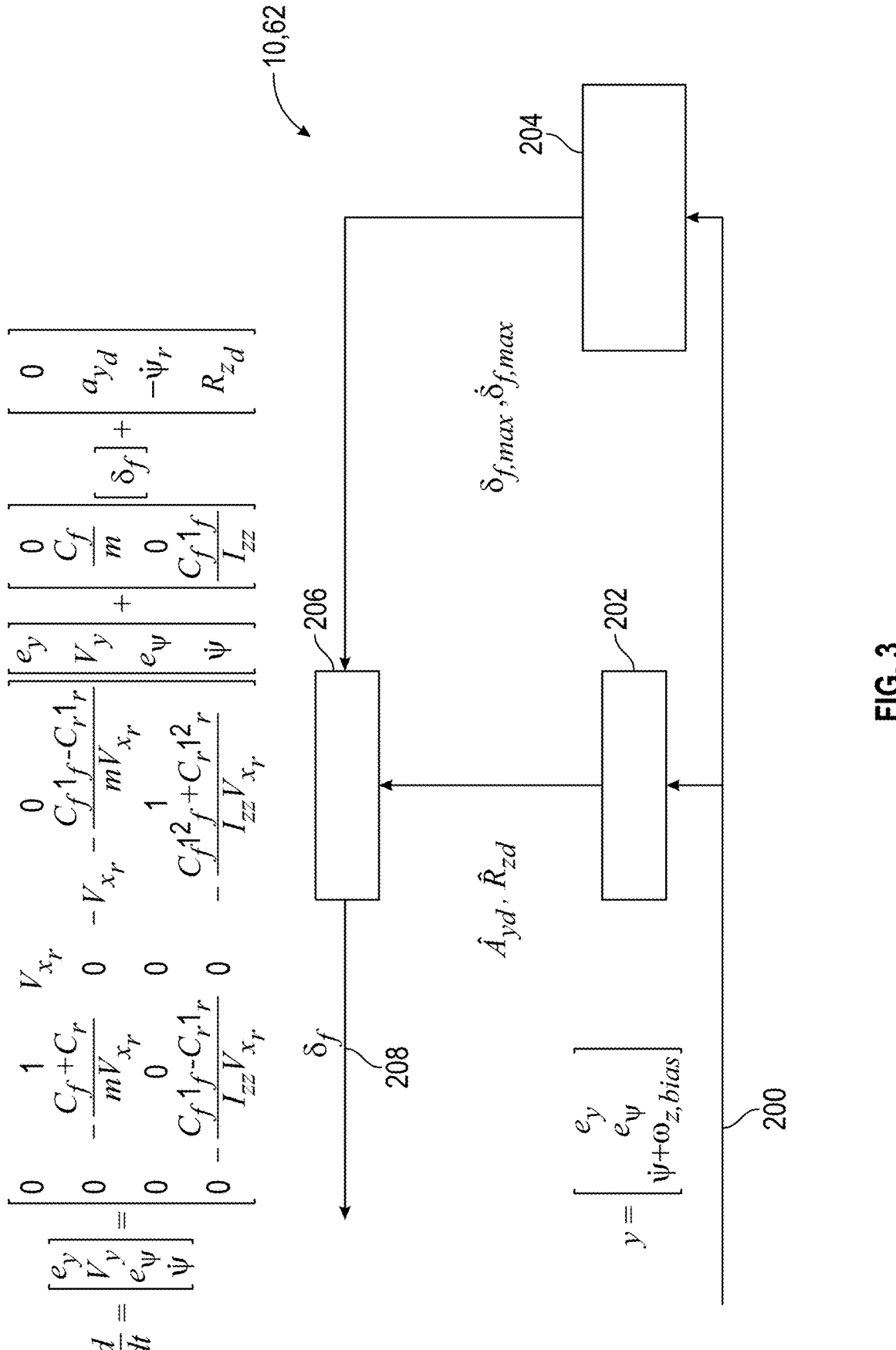
FIG. 3 is a flowchart depicting the utilization of a Kalman filter and actuator constraints to adapt outputs of the MPLC control system of FIG. 1 to overcome disturbances according to an exemplary embodiment.

Referring now to FIGS. 2A, 2B, and 3 and with continuing reference to FIG. 1, the system 10 utilizes one or more applications 60, specifically a MPLC application 62, stored in the memory 56, to manage and coordinate chassis and driveline actuators 26 of the vehicle 12 to optimally maintain lane 100 position on a road surface 102.

Specifically, the MPLC application 62 includes a plurality of subroutines that perform distinct, but interrelated functions that cause the vehicle 12 to operate predictably in autonomous or semi-autonomous modes while maintaining lane 100 position. More specifically, the MPLC application 62 performs model predictive control (MPC) for lane 100 centering with reference-switching, arbitrating between a physically static reference path 104 and a dynamic reference path 106 for automated or on-demand lane 100 changes. In several aspects, the dynamic reference path 106 is effectively a smooth path between a current static reference path 104, and a future static reference path 104'. In order to maintain smooth transitions between lanes 100, weights 108 within MPC calculations are or may be temporarily modified such that input weights penalize rapid changes in actuator 26 positions, such as rapid changes in steering system 24 position or steering system 24 angle, and steering system 24 angle and rate are bounded by predefined input constraints. That is, the MPC weights depend on control objectives. When a reference changes, the weights change as well. More specifically, when a reference changes, some weights are reduced and subsequently ramp to nominal values over a period of time, thereby smoothing the transition. Depending on whether the reference is a static reference path 104 or a dynamic reference path 106, three distinct inputs to the MPC are altered, namely: initial lateral error (e_y), initial heading error (e_ψ), and reference curvature waypoints (ψ̇_r). In an exemplary non-limiting embodiment, the MPC calculation may be visualized through the equation below:

$$\frac{d}{dt}\begin{bmatrix} e_y \\ V_y \\ e_\psi \\ \dot\psi \end{bmatrix} =$$

-continued $$\begin{bmatrix} 0 & 1 & V_{x_r} & 0 \\ 0 & -\dfrac{C_f+C_r}{mV_{x_r}} & 0 & -V_{x_r}-\dfrac{C_f l_f - C_r l_r}{mV_{x_r}} \\ 0 & 0 & 0 & 1 \\ 0 & -\dfrac{C_f l_f - C_r l_r}{I_{zz}V_{x_r}} & 0 & -\dfrac{C_f l_f^2 - C_r l_r^2}{I_{zz}V_{x_r}} \end{bmatrix}\begin{bmatrix} e_y \\ V_y \\ e_\psi \\ \dot\psi \end{bmatrix} +$$

$$\begin{bmatrix} 0 \\ \dfrac{c_f}{m} \\ 0 \\ \dfrac{C_f l_f}{I_{zz}} \end{bmatrix}[\delta_f] + \begin{bmatrix} 0 \\ a_{y_d} \\ -\dot\psi_r \\ R_{z_d} \end{bmatrix}$$

where:

$V_x$ or $V_{x_r}$ defines vehicle 12 longitudinal velocity;

$V_y$ is vehicle 12 lateral velocity;

$\omega_z$ or $\psi$ is a yaw rate of the vehicle 12;

$e_y$ is a lateral error (distance) from target path 104;

$e_\psi$ is a heading error from target path 104;

$\psi_r$ is a yaw rate reference of target path 104 (related to target path 104 curvature);

m is a mass of the vehicle 12;

Izz is a rotational inertia of the vehicle 12;

$l_f$, $l_r$ are distances from a center of gravity of the vehicle 12 to front and rear axles 42, 40 of the vehicle 12;

$C_f$, $C_r$ are front and rear tire 43 cornering stiffnesses;

$\delta_f$ is a front steering angle, and $\delta_r$ is a rear steering angle (if so equipped, both commanded by controller 22);

$A_{yd}$ and $R_{zd}$ are lateral acceleration (force) and yaw acceleration (moment) disturbances, respectively;

x, $x_d$ are state vector, and vector of disturbance/uncertainty states, respectively; and ^ A hat on top of any of the above-noted variables indicates that the hatted-variable is an estimate.

The MPLC 62 utilizes model predictive control (MPC) for vehicle 12 trajectory tracking based on the static reference path 104. The static reference path 104 may be described as a target path which is a fixed path in space on the road surface 102. In several examples, the static reference path 104 may be a lane center 112, but it should be appreciated that in some additional non-limiting examples, the static reference path 104 may be a path that is parallel to the lane center 112 without actually being the lane center 112. For example, in some circumstances, when an adjacent vehicle 12' is at or near a lane line 114 adjacent the host vehicle 12, the static reference path 104 may be automatically adjusted by the MPLC application 62 to remain within the current lane 100, but to provide additional separation or distance between the host vehicle 12 and the adjacent vehicle 12', thus causing the static reference path 104 to a be parallel to, but not identical to the lane center 112. That is, the static reference path 104 may be offset 116 from the lane center 112. In several aspects, when the ADAS system 28 of the vehicle 12 is tasked only with lane 100 centering, the relevant reference is generated based on a perceived lane center 112 and a desired offset 116 therefrom. By contrast, when the objective of the ADAS system 28 is a lane change, evasive maneuver, or the like, the relevant reference is generated to create a path blending from the vehicle's 12 current position and heading to a target lane 101 at a predetermined lookahead distance.

Turning now more specifically to FIG. 3 and with continuing reference to FIGS. 1 and 2, a lane 100 change procedure using the MPLC application 62 is shown in further detail as a series of logic steps in flowchart form.

Input information 200 from various sensors 18 and actuators 26 of the vehicle 12 is received by the MPLC application 62. In several aspects, the input information 200 includes measurements in the X and/or Y directions of vehicle 12 travel, including but not limited to: lateral error $e_y$, heading error $e_\psi$, and yaw rate $\omega_z$ or $\dot\psi$ of the vehicle 12. The input information 200 is fed forward to both a Kalman filter 202 and a reference anomaly detection subroutine 204.

The Kalman filter 202 estimates at least an acceleration disturbance $\hat{A}_{yd}$, a lateral force disturbance, a yaw moment disturbance $\hat{R}_{zd}$ acting on the vehicle 12, as well as a measurement bias corrupting the measured yaw rate $\omega_z$ or $\dot\psi$. It should be appreciated that the yaw rate may include a measurement bias $\hat{W}_{zd}$, for which the MPLC 62 adapts, as will be described below. The estimated disturbances are applied along the prediction horizon in the MPC, thereby compensating for the bias. By applying the estimated disturbances along the prediction horizon of the MPC, estimated disturbances are compensated for, and disturbances thereby have a decreased impact on vehicle 12 dynamics. Furthermore, a bias-adjusted yaw rate $\omega_z$ or $\dot\psi$ is used in the initialization state of the MPC, thereby allowing the MPLC 62, via the Kalman filter to compensate for any biases. In several non-limiting examples, the Kalman filter 202 estimates the vehicle 12 state from vehicle 12 speed, front and/or rear steering angles $\delta_f$, $\delta_r$, and yaw rate $\omega_z$ or $\omega$ of the vehicle 12, as well as vehicle 12 motion relative to the measured static reference path 104, such as lane center 112.

The reference anomaly detection subroutine 204 detects anomalies in MPC reference trajectories or paths 104. More specifically, anomalies are detected by comparing the trajectory offset 116, vehicle 12 heading and vehicle 12 current path curvature with respective moving averages. Anomalies are detected when one or more differences between the vehicle 12 current path curvature and heading 12 and the reference trajectory or path 104 exceed a predetermined and/or variable threshold value. Anomaly detection is inhibited using semantic data from a trajectory planner portion of the MPLC application 62, such as when a lane 100 change is requested by either the vehicle 12 operator or by ADAS 28 operating to control the vehicle 12 path. That is, anomaly detection is inhibited so that the ADAS 28 and MPLC 62 can properly and effectively carry out a lane 100 change when such a maneuver is desired.

Kalman filter 202 outputs and reference anomaly detection subroutine 204 outputs are passed then to an MPC subroutine 206. More specifically, disturbances $\hat{A}_{yd}$, $\hat{R}_{zd}$ are reported to the MPC subroutine 206. It will be appreciated that actuators 26 of a vehicle 12, such as that described hereinabove, are constrained to operate within predictable parameters, and for one or more specific purposes. For example, a steering system 24 position is limited by mechanical and/or electronic limits of a given steering rack, axle 42, 40, and wheels 30. Accordingly, steering system 24 actuators 26 are constrained through one or more of physical and/or electronic limits to not allow steering angle $\delta_f$, $\delta_r$ that exceed the physical and/or electronic limits for the steering system 24. Such constraints may include both hardware and software-imposed limitations, such as physical stops and physical rate limits, as well as electronically or software-imposed articulation limitations or articulation rate limits without departing from the scope or intent of the present disclosure. In further aspects, the constraints may be adaptable and dependent upon any of a variety of different factors, including but not limited to vehicle 12 location, speed, attitude, inclination, or the like. It should further be appreciated that the exemplary steering system 24 actuators 26 are intended only as a non-limiting example of the types of constraints that may be applied to the actuators 26 of the vehicle 12. Accordingly, steering angle $\delta_f$, $\delta_r$ minimums and maximums $\delta_{f,min}$, $\delta_{f,max}$, $\delta_{r,min}$, $\delta_{f,max}$, as well as steering angle rate minimums and maximums $\dot\delta_{f,min}$, $\dot\delta_{f,max}$, $\dot\delta_{r,min}$, $\dot\delta_{f,max}$, define actuator 26 constraints that are applied to the output of the reference anomaly detection subroutine 204 before being received by the MPC subroutine 206. The actuator 26 constraints have a variety of effects, but in particular they have the practical advantage of limiting actuator 26 outputs to practical, feasible actuator 26 outputs that can be implemented by vehicle 12 systems properly and appropriately.

Within the MPC subroutine 206, MPC constraints are adjusted in response to detected anomalies. Following a detected anomaly, actuator 26 magnitude and rate limits used by the MPC subroutine 206 before generating output commands 208, such as steering system 24 angle $\delta_f$ commands, are decreased from a first level to a second level less than the first level for a predetermined and/or variable period of time. The actuator 26 magnitude limit is adjusted to limit lateral acceleration to within a band of predicted lateral acceleration values based on a last anomaly-free target reference path 104 or dynamic reference path 106 trajectory curvature. The actuator 26 rate limit subsequently steps down to a calibratable fraction of the actuator 26 nominal limit. Both magnitude and rate limits are held at reduced values for a predetermined and/or variable period of time before increasing linearly back to their respective nominal values. The predetermined and/or variable period of time is a recovery period that is tuned empirically to be of sufficient length to mitigate an event and allow a vehicle 12 operator enough time to respond, while also being short enough in duration not to cause the vehicle 12 to drift out of a lane 100 when the event is short-lived. In some non-limiting examples, there are two times at which the magnitude and rate limits or weights and constraints are held at an adjusted value, then the time at which each ramps back to a nominal value. The predetermined and/or variable period of time may range between approximately two (2) to three (3) seconds for each of the times at which the magnitude and rate limits are held at the adjusted value, amounting to approximately four (4) to six (6) seconds total. In another practical example, an absolute minimum and an absolute maximum duration for the predetermined and/or variable period of time extends from approximately 0.5 seconds to approximately five (5) seconds, or approximately one (1) second to approximately ten (10) seconds total, accounting for both of the two times during which the magnitude and rate limits or weights and constraints are held at the adjusted values. The MPC subroutine 206 generated output commands 208 cause the vehicle 12 to actively and adaptively adjust the positions and rates of various actuators 26 to allow the vehicle 12 to selectively and accurately follow the target reference path 104, and/or dynamic reference path 106, including any applicable offsets 116.

Figure 4:
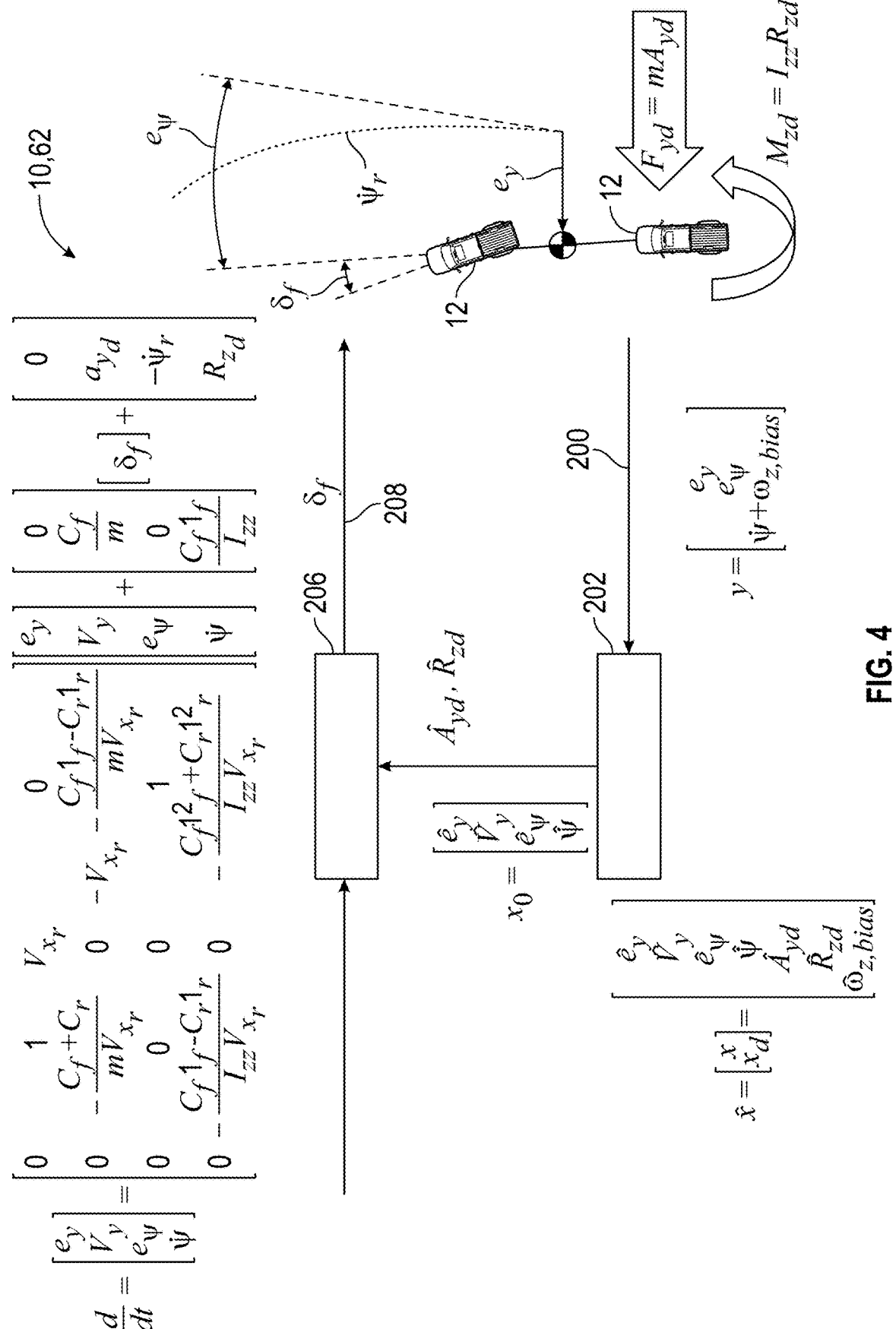
FIG. 4 is a flowchart depicting the utilization of a Kalman filter for zero-offset control to adapt outputs of the MPLC control system of FIG. 1 to overcome disturbances according to an exemplary embodiment.
Figure 5:
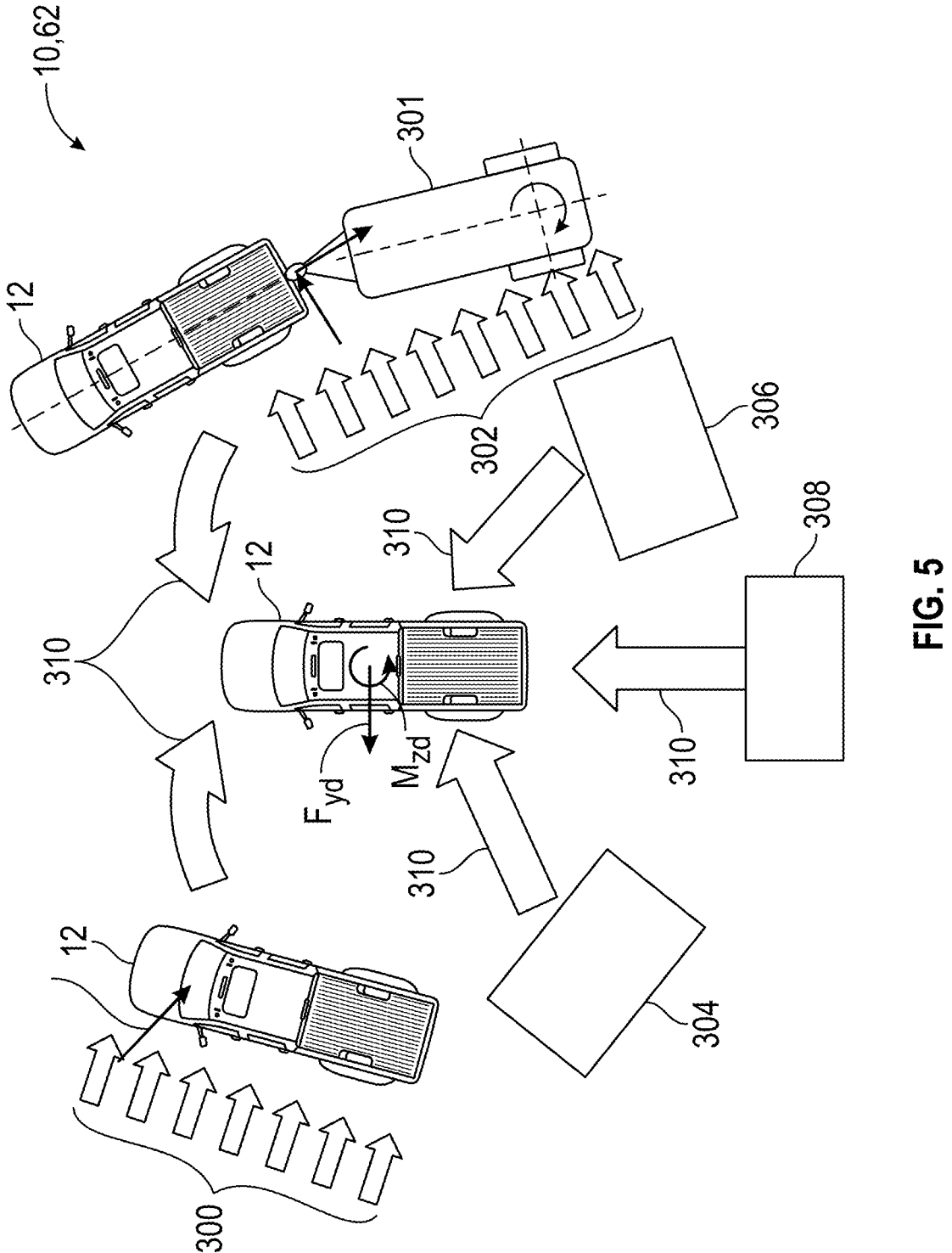
FIG. 5 is a top perspective view of a vehicle equipped with the MPLC control system of FIG. 1, where the vehicle is shown being subjected to several different situational forces, torques, and moments according to an exemplary embodiment.

Turning now to FIGS. 4 and 5 and with continuing reference to FIGS. 1-3, in some examples, the MPLC 62 may be used for zero-offset control. The Kalman filter 202 may situationally provide zero-lateral-offset control in the presence of simultaneous force and moment disturbances and/or simultaneous heading and/or curvature errors. To achieve zero-offset control using the Kalman filter 202, the MPLC 62 utilizes measurements such as:

15

$$y = \begin{bmatrix} e_y \\ e_y \\ \dot{\psi} + w_{z,bias} \end{bmatrix},$$

and state information $$\hat{x} = \begin{bmatrix} x \\ x_d \end{bmatrix} = \begin{bmatrix} \hat{e}_y \\ \hat{V}_y \\ \hat{e}_\psi \\ \dot{\hat{\psi}} \\ \hat{A}_{yd} \\ \hat{A}_{zd} \\ \hat{w}_{z,bias} \end{bmatrix},$$

to generate an initial state:

$$x_0 = \begin{bmatrix} x \\ x_d \end{bmatrix} = \begin{bmatrix} \hat{e}_y \\ \hat{V}_y \\ \hat{e}_\psi \\ \dot{\hat{\psi}} \end{bmatrix},$$

which, when combined with at least lateral and yaw moment disturbances $\hat{A}_{yd}$, $\hat{R}_{zd}$ and processed within the MPC subroutine 206 utilizing the MPC calculation:

$$\frac{d}{dt}\begin{bmatrix} e_y \\ V_y \\ e_\psi \\ \dot{\psi} \end{bmatrix} = \begin{bmatrix} 0 & 1 & V_{x_r} & 0 \\ 0 & -\frac{C_f + C_r}{mV_{x_r}} & 0 & -V_{x_r} - \frac{C_f 1_f - C_r 1_r}{mV_{x_r}} \\ 0 & 0 & 0 & 1 \\ 0 & -\frac{C_f 1_f - C_r 1_r}{I_{zz}V_{x_r}} & 0 & -\frac{C_f 1_f^2 - C_r 1_r^2}{I_{zz}V_{x_r}} \end{bmatrix}\begin{bmatrix} e_y \\ V_y \\ e_\psi \\ \dot{\psi} \end{bmatrix} + \begin{bmatrix} 0 \\ \frac{c_f}{m} \\ 0 \\ \frac{C_f 1_f}{I_{zz}} \end{bmatrix}[\delta_f] + \begin{bmatrix} 0 \\ a_{yd} \\ -\dot{\psi}_r \\ R_{zd} \end{bmatrix}$$

generates a command 208 such as the steering angle command 8r that causes the vehicle 12 to maintain a zero-offset position while operating. In a further example, upon receiving one or more of an occupant command or an ADAS 28 command to change from a current lane 100 to an adjacent lane 101, the MPLC application 62, which performs lane 100 centering functions during steady-state operation, switches from static reference 104 tracking to dynamic tracking 106 that allows the vehicle 12 to alter course smoothly to transition from the current lane 100 to the adjacent lane 101. The MPLC application 62 generates output commands to various actuators 26 of the vehicle 12, including steering system 24 angle $\delta_f$ commands that initiate a departure from static reference tracking 104 to dynamic reference 106 tracking, and subsequently blending from the dynamic reference 106 tracking to tracking a second static reference 104' in the adjacent lane 101.

Turning now to FIG. 5 and with continuing reference to FIGS. 1-4, a visual representation of the MPLC application 62 performing mitigation of anomalies relative to the reference trajectory 104, 106 is shown schematically in additional detail. Broadly, the MPLC application 62 calculates external forces, $F_{xd}$, $F_{yd}$, and torques $M_{zd}$ currently applied to or by the vehicle 12. In some examples, as shown in FIG. 4, crosswind forces 300 may be applied unevenly to vehicle 12 exterior surfaces, trailer 301 moment or torque forces 302 may be applied unevenly both longitudinally and laterally, and as a torque to the vehicle 12. Model mismatches 304 may result in force $F_{xd}$, $F_{yd}$, and torque $M_{zd}$ mismatches between expected and actual values, as can road surface 102 imperfections inclinations 306, banking 308, and the like. Each such externally-applied force or torque $F_{xd}$, $F_{yd}$, and torques $M_{zd}$ is modeled to generate force and/or torque equivalents 310 which are subsequently used by the MPLC 62 to maintain lane 100 position with zero offset. In some examples, the reference trajectory 104, 106 may be discontinuous or may "jump" according to road surface 102 markings, such as lane lines 114 indicating entrance or exit ramps, turn lanes, and the like. In response to detecting such an anomalous road marking, for example a jump in a reference heading, with the plurality of onboard sensors 18, the MPLC application 62 causes the steering system 24 magnitude and rate limits to tighten in response to the detected jump in reference heading. After a predetermined, and/or variable quantity of time, the steering system 24 magnitude and rate limits ramp back to a nominal value. The tightening of the magnitude and rate limits peak lateral acceleration and jerks that may be experienced by vehicle 12 occupants in response to trajectory anomalies. Thus, by attenuating or otherwise so remediating peak lateral acceleration and jerks, vehicle occupant comfort and confidence in ADAS system 28 function is ensured.

A model predictive lane centering control (MPLC) system 10 of the present disclosure offers several advantages. These include, but are not limited to: the ability to utilize preexisting infrastructure to autonomously and/or semi-autonomously allow for vehicles to navigate lane change requests smoothly, with high accuracy, robustness and redundancy, while maintaining or decreasing computational resource utilization and reducing effects of disturbances on driving smoothness of system-operated vehicles. Moreover, the MPC-based control of the system 10 reduces calibration efforts because vehicle 12 dynamics are inherent to the controller 22. Actuator constraints prevent actuators 26 from being commanded to perform actions that are beyond their scope of capability, while reference switching provides full flexibility to tune control responses of automated lane 100 changes, whereas with a static reference 104 alone, it can be difficult or impractical to tune lane 100 changes smoothly. Using dynamic references 106 for lane changes provides flexibility to achieve heightened lane change performance while, at least traditionally there is insufficient flexibility to dampen the initialization of a lane change maneuver without also excessively numbing the end of the lane change. Finally, through utilization of the Kalman filter 202, zero-offset tracking is still ensured even in the presence of unknown disturbances, biases, or model mismatches 304.

The description of the present disclosure is merely exemplary in nature and variations that do not depart from the gist of the present disclosure are intended to be within the scope of the present disclosure. Such variations are not to be regarded as a departure from the spirit and scope of the present disclosure.

17

18

What is claimed is:

1. A system for model predictive lane centering (MPLC) control with reference switching and disturbance rejection, the system comprising:

a vehicle;

one or more sensors disposed on the vehicle, the one or more sensors measuring real-time static and dynamic data about the vehicle;

one or more actuators disposed on the vehicle, the one or more actuators altering static and dynamic characteristics of the vehicle;

a controller having a processor, a memory, and input/output (I/O) ports, the I/O ports in communication with the one or more sensors and the one or more actuators, the processor executing program code portions stored in the memory, the program code portions including an MPLC application comprising:

a first control logic for utilizing model predictive control (MPC) for selectively tracking static and dynamic references;

a second control logic for adapting MPC weights and constraints for trajectory tracking when the system switches between static and dynamic references;

a third control logic that utilizes a Kalman filter to estimate a lateral force disturbance and a yaw moment disturbance acting upon the vehicle, and a measurement bias corrupting a measured yaw rate;

a fourth control logic for detecting anomalies in MPC reference trajectory; and a fifth control logic for adjusting actuator constraints in response to a detected anomaly, wherein the system for MPLC control actively and continuously adjusts actuator output commands to selectively cause the vehicle to track and follow a current lane center, wherein upon receiving a lane change command from one or more of a vehicle occupant and an advanced driver assistance system (ADAS), the MPLC application switches to tracking the dynamic reference, wherein the dynamic reference is a smooth path that extends between a current static reference, and a future static reference; and upon receipt of the lane change command, smoothly executes a lane change by instructing the one or more actuators to alter position and smoothly alter a vehicle trajectory to enter an adjacent lane before returning to tracking and following a center of the adjacent lane.

2. The system of claim 1, wherein the first control logic further comprises:

control logic for obtaining data from the one or more sensors and the one or more actuators;

control logic for performing static reference tracking, wherein the static reference tracking causes the vehicle to track and follow the current lane center; and control logic for offsetting the vehicle from the current lane center while following and tracking the current lane center.

3. The system of claim 1, wherein the second control logic further comprises:

control logic for adaptively adjusting MPC weights based on control objectives, wherein when a reference changes, the weights change; and control logic that, upon receipt of the lane change command, adaptively adjusts weights and constraints and subsequently ramps the weights and constraints back to nominal values over a predetermined period of time, thereby smoothing a transition between tracking static and dynamic references.

4. The system of claim 3, further comprising:

control logic that penalizes rapid changes in actuators positions;

control logic that, depending on whether a reference is a static reference or a dynamic reference, alters three distinct inputs to the MPC, namely: initial lateral error ($e_y$), initial heading error ($e_\psi$), and reference curvature waypoints ($\dot\psi_r$) according to:

$$\frac{d}{dt}\begin{bmatrix} e_y \\ V_y \\ e_\psi \\ \dot\psi \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz}V_{x_r}} & 0 & -\dfrac{C_f 1_f^2 - C_r 1_r^2}{I_{zz}V_{x_r}} \end{bmatrix}\begin{bmatrix} e_y \\ V_y \\ e_\psi \\ \dot\psi \end{bmatrix} +$$

$$\begin{bmatrix} 0 \\ \dfrac{c_f}{m} \\ 0 \\ \dfrac{C_f 1_f}{I_{zz}} \end{bmatrix}[\delta_f] + \begin{bmatrix} 0 \\ a_{y_d} \\ -\dot\psi_r \\ R_{z_d} \end{bmatrix}$$

where: $V_x$ or $V_{x_r}$ defines a vehicle longitudinal velocity; $V_y$ is vehicle lateral velocity; $\omega_z$ or $\psi$ is a yaw rate of the vehicle; $e_y$ is a lateral error (distance) from a target path; $e_\psi$ is a heading error from target path; $\psi_r$ is a yaw rate reference of target path (related to target path curvature); m is a mass of the vehicle; Izz is a rotational inertia of the vehicle; $1_f$, $1_r$ are distances from a center of gravity of the vehicle to front and rear axles of the vehicle; $C_f$, $C_r$ are front and rear tire cornering stiffnesses; $\delta_f$ is a front steering angle, and $\delta_r$ is a rear steering angle; and $a_{y_d}$ and $R_{z_d}$ are lateral acceleration (force) and yaw acceleration (moment) disturbances, respectively.

5. The system of claim 1, wherein the third control logic further comprises:

control logic that compensates for estimated lateral force disturbance and estimated yaw moment disturbance by applying each of the estimated lateral force disturbance and estimated yaw moment disturbance along a prediction horizon in the MPC; and control logic that utilizes a bias-adjusted yaw rate in an initial state of the MPC, thereby compensating for an estimated measurement bias.

6. The system of claim 5, wherein Kalman filter estimations of lateral force disturbance and estimated yaw moment disturbance use measured vehicle speeds and vehicle motion relative to a measured static reference, wherein the measured static reference defines a static reference path.

7. The system of claim 1, wherein the fourth control logic further comprises:

control logic that detects anomalies in the MPC reference trajectory by comparing a trajectory offset, a heading, and a curvature with respect to moving averages of the trajectory offset, heading, and curvature; and control logic that detects an anomaly when a difference between one or more of the trajectory offset, heading and curvature and moving averages of the trajectory offset, heading and curvature exceed a predetermined threshold.

8. The system of claim 7, further comprising:

control logic that inhibits anomaly detection using semantics from a trajectory planner in predefined situations including when a lane change has been requested.

9. The system of claim 1, wherein the fifth control logic further comprises:

control logic that adjusts actuator constraints by decreasing actuator magnitude and rate limits from a first level to a second level less than the first level for a predetermined period of time upon detecting an anomaly, wherein the actuator magnitude limit is adjusted to limit vehicle lateral acceleration to within a band of predicted lateral acceleration based on a last anomaly-free reference trajectory curvature.

10. The system of claim 9, further comprising:

control logic that steps the actuator rate limit down to a calibratable fraction of a nominal actuator rate limit during the predetermined period of time; and wherein both magnitude and rate limits are temporarily held at reduced value before increasing linearly back to nominal values.

11. A method for model predictive lane centering (MPLC) control with reference switching and disturbance rejection, the method comprising:

measuring real-time static and dynamic data about a vehicle with one or more sensors disposed on the vehicle;

altering static and dynamic characteristics of the vehicle with one or more actuators disposed on the vehicle;

executing, by a processor of a controller of the vehicle, program code portions stored in memory of the controller, the controller further including input/output (I/O) ports, communicating with the one or more sensors and the one or more actuators, the program code portions including an MPLC application comprising control logic for:

utilizing model predictive control (MPC) for selectively tracking static and dynamic references;

adapting MPC weights and constraints for trajectory tracking when switching between static and dynamic references, including:

adaptively adjusting MPC weights based on control objectives, wherein when a reference changes, the weights change; and upon receipt of a lane change command, adaptively adjusting weights and constraints and subsequently ramps the weights and constraints back to nominal values over a predetermined period of time, thereby smoothing a transition between tracking static and dynamic references;

utilizing a Kalman filter to estimate a lateral force disturbance and a yaw moment disturbance acting upon the vehicle, and a measurement bias corrupting a measured yaw rate;

detecting anomalies in MPC reference trajectory; and adjusting actuator constraints in response to a detected anomaly, wherein the MPLC application actively and continuously adjusts actuator output commands to selectively cause the vehicle to track and follow a current lane center, and upon receipt of a lane change command, smoothly executes a lane change by instructing the one or more actuators to alter position and smoothly alter a vehicle trajectory to enter an adjacent lane before returning to tracking and following a center of the adjacent lane.

12. The method of claim 11, further comprising:

obtaining data from the one or more sensors and the one or more actuators;

performing static reference tracking, wherein the static reference tracking causes the vehicle to track and follow the current lane center; and offsetting the vehicle from the current lane center while following and tracking the current lane center.

13. The method of claim 11, wherein upon receiving the lane change command from one or more of a vehicle occupant and an advanced driver assistance system (ADAS), executing control logic of the MPLC application that switches to tracking the dynamic reference, wherein the dynamic reference is a smooth path that extends between a current static reference, and a future static reference.

14. The method of claim 11, further comprising:

penalizing rapid changes in actuators positions;

depending on whether a reference is a static reference or a dynamic reference, alters three distinct inputs to the MPC, namely: initial lateral error ($e_y$), initial heading error ($e_\psi$), and reference curvature waypoints ($\psi_r$) according to:

$$\frac{d}{dt}\begin{bmatrix} e_y \\ V_y \\ e_\psi \\ \dot{\psi} \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz}V_{x_r}} & 0 & -\dfrac{C_f 1_f^2 - C_r 1_r^2}{I_{zz}V_{x_r}} \end{bmatrix}\begin{bmatrix} e_y \\ V_y \\ e_\psi \\ \dot{\psi} \end{bmatrix} +$$

$$\begin{bmatrix} 0 \\ \dfrac{c_f}{m} \\ 0 \\ \dfrac{C_f 1_f}{I_{zz}} \end{bmatrix}[\delta_f] + \begin{bmatrix} 0 \\ a_{y_d} \\ -\dot{\psi}_r \\ R_{z_d} \end{bmatrix}$$

where: $V_x$ or $V_{xr}$ defines a vehicle longitudinal velocity; $V_y$ is vehicle lateral velocity; $\omega_z$ or $\psi$ is a yaw rate of the vehicle; $e_y$ is a lateral error (distance) from a target path; $e_\psi$ is a heading error from target path; $\psi_r$ is a yaw rate reference of target path (related to target path curvature); m is a mass of the vehicle; Izz is a rotational inertia of the vehicle; $1_f$, $1_r$ are distances from a center of gravity of the vehicle to front and rear axles of the vehicle; $C_f$, $C_r$ are front and rear tire cornering stiffnesses; $\delta_f$ is a front steering angle, and $\delta_r$ is a rear steering angle; and $a_{yd}$ and $R_{zd}$ are lateral acceleration (force) and yaw acceleration (moment) disturbances, respectively.

15. The method of claim 11, further comprising:

compensating for estimated lateral force disturbance and estimated yaw moment disturbance by applying each of the estimated lateral force disturbance and estimated yaw moment disturbance along a prediction horizon in the MPC; and utilizing a bias-adjusted yaw rate in an initial state of the MPC, thereby compensating for an estimated measurement bias.

16. The method of claim 15, further comprising:

using measured vehicle speeds and vehicle motion relative to a measured static reference, wherein the measured static reference defines a static reference path to generate Kalman filter estimations of lateral force disturbance and estimated yaw moment disturbance.

17. The method of claim 11, further comprising:
detecting anomalies in the MPC reference trajectory by comparing a trajectory offset, a heading, and a curvature with respect to moving averages of the trajectory offset, heading, and curvature; and
detecting an anomaly when a difference between one or more of the trajectory offset, heading and curvature and moving averages of the trajectory offset, heading and curvature exceed a predetermined threshold.

18. The method of claim 11, further comprising:
adjusting actuator constraints by decreasing actuator magnitude and rate limits from a first level to a second level less than the first level for a predetermined period of time upon detection of an anomaly, wherein the actuator magnitude limit is adjusted to limit vehicle lateral acceleration to within a band of predicted lateral acceleration based on a last anomaly-free reference trajectory curvature; and
stepping the actuator rate limit down to a calibratable fraction of a nominal actuator rate limit during the predetermined period of time; and
wherein both magnitude and rate limits are temporarily held at reduced value before increasing linearly back to nominal values.

19. The method of claim 17 further comprising:
inhibiting anomaly detection using semantics from a trajectory planner in predefined situations including when a lane change has been requested.

20. A method for model predictive lane centering (MPLC) control with reference switching and disturbance rejection, the method comprising:
measuring real-time static and dynamic data about a vehicle with one or more sensors disposed on the vehicle;
altering static and dynamic characteristics of the vehicle with one or more actuators disposed on the vehicle;
executing, by a processor of a controller of the vehicle, program code portions stored in memory of the controller, the controller further including input/output (I/O) ports, communicating with the one or more sensors and the one or more actuators, the program code portions including an MPLC application comprising control logic for:
utilizing model predictive control (MPC) for selectively tracking static and dynamic references, including:
obtaining data from the one or more sensors and the one or more actuators;
performing static reference tracking, wherein the static reference tracking causes the vehicle to track and follow a current lane center; and
offsetting the vehicle from the current lane center while following and tracking the current lane center, wherein upon receiving a lane change command from one or more of a vehicle occupant and an advanced driver assistance system (ADAS), executing control logic of the MPLC application that switches to tracking the dynamic reference, wherein the dynamic reference is a smooth path that extends between a current static reference, and a future static reference;
adapting MPC weights and constraints for trajectory tracking when switching between static and dynamic references, including:

adaptively adjusting MPC weights based on control objectives, wherein when a reference changes, the weights change; and
upon receipt of the lane change command, adaptively adjusting weights and constraints and subsequently ramps the weights and constraints back to nominal values over a predetermined period of time, thereby smoothing a transition between tracking static and dynamic references;
penalizing rapid changes in actuators positions;
depending on whether a reference is a static reference or a dynamic reference, alters three distinct inputs to the MPC, namely: initial lateral error ($e_y$), initial heading error ($e_\psi$), and reference curvature waypoints ($\dot{\psi}_r$) according to:

$$\frac{d}{dt}\begin{bmatrix} e_y \\ V_y \\ e_\psi \\ \dot{\psi} \end{bmatrix} =$$

$$\begin{bmatrix} 0 & 1 & V_{x_r} & 0 \\ 0 & -\dfrac{C_f + C_r}{mV_{x_r}} & 0 & -V_{x_r} - \dfrac{C_f 1_f - C_r 1_r}{mV_{x_r}} \\ 0 & 0 & 0 & 1 \\ 0 & -\dfrac{C_f 1_f - C_r 1_r}{I_{zz}V_{x_r}} & 0 & -\dfrac{C_f 1_f^2 - C_r 1_r^2}{I_{zz}V_{x_r}} \end{bmatrix} \begin{bmatrix} e_y \\ V_y \\ e_\psi \\ \dot{\psi} \end{bmatrix} +$$

$$\begin{bmatrix} 0 \\ \dfrac{c_f}{m} \\ 0 \\ \dfrac{C_f 1_f}{I_{zz}} \end{bmatrix}[\delta_f] + \begin{bmatrix} 0 \\ a_{y_d} \\ -\dot{\psi}_r \\ R_{z_d} \end{bmatrix}$$

where: $V_x$ or $V_{x_r}$ defines a vehicle longitudinal velocity; $V_y$ is vehicle lateral velocity; $\omega_z$ or $\psi$ is a yaw rate of the vehicle; $e_y$ is a lateral error (distance) from a target path; $e_\psi$ is a heading error from target path; $\psi_r$ is a yaw rate reference of target path (related to target path curvature); m is a mass of the vehicle; Izz is a rotational inertia of the vehicle; $1_f$, $1_r$ are distances from a center of gravity of the vehicle to front and rear axles of the vehicle; $C_f$, $C_r$ are front and rear tire cornering stiffnesses; $\delta_f$ is a front steering angle, and $\delta_r$ is a rear steering angle; and $a_{yd}$ and $R_{zd}$ are lateral acceleration (force) and yaw acceleration (moment) disturbances, respectively;
utilizing a Kalman filter to estimate a lateral force disturbance and a yaw moment disturbance acting upon the vehicle, and a measurement bias corrupting a measured yaw rate, including:
compensating for estimated lateral force disturbance and estimated yaw moment disturbance by applying each of the estimated lateral force disturbance and estimated yaw moment disturbance along a prediction horizon in the MPC;
utilizing a bias-adjusted yaw rate in an initial state of the MPC, thereby compensating for an estimated measurement bias; and
using measured vehicle speeds and vehicle motion relative to a measured static reference, wherein the measured static reference defines a static reference path to generate Kalman filter estimations of lateral force disturbance and estimated yaw moment disturbance;

detecting anomalies in MPC reference trajectory, including:

detecting anomalies in the MPC reference trajectory by comparing a trajectory offset, a heading, and a curvature with respect to moving averages of the trajectory offset, heading, and curvature;

detecting an anomaly when a difference between one or more of the trajectory offset, heading and curvature and moving averages of the trajectory offset, heading and curvature exceed a predetermined threshold; and inhibiting anomaly detection using semantics from a trajectory planner in predefined situations including when a lane change has been requested; and adjusting actuator constraints in response to a detected anomaly, including:

adjusting actuator constraints by decreasing actuator magnitude and rate limits from a first level to a second level less than the first level for a predetermined period of time upon detection of an anomaly, wherein the actuator magnitude limit is adjusted to limit vehicle lateral acceleration to within a band of predicted lateral acceleration based on a last anomaly-free reference trajectory curvature; and stepping the actuator rate limit down to a calibratable fraction of a nominal actuator rate limit during the predetermined period of time; and wherein both magnitude and rate limits are temporarily held at reduced value before increasing linearly back to nominal values, wherein the MPLC application actively and continuously adjusts actuator output commands to selectively cause the vehicle to track and follow a current lane center, and upon receipt of a lane change command, smoothly executes a lane change by instructing the one or more actuators to alter position and smoothly alter a vehicle trajectory to enter an adjacent lane before returning to tracking and following a center of the adjacent lane.

\* \* \* \* \*